(12) United States Patent
Blackburn

(10) Patent No.: US 6,198,239 B1
(45) Date of Patent: Mar. 6, 2001

(54) HYSTERESIS CONTROL IN SWITCHED RELUCTANCE MOTORS

(75) Inventor: Scott E. Blackburn, Temperance, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/094,803

(22) Filed: Jun. 15, 1998

(51) Int. Cl.[7] .................................................. H02P 1/18
(52) U.S. Cl. ........................ 318/254; 318/138; 318/439
(58) Field of Search ................................. 318/138, 254, 318/439, 685, 696, 701

(56) References Cited

U.S. PATENT DOCUMENTS

| | | | |
|---|---|---|---|
| 4,321,518 | 3/1982 | Akamatsu | 318/696 |
| 4,447,771 * | 5/1984 | Whited | 318/661 |
| 4,490,661 * | 12/1984 | Brown et al. | 318/661 |
| 4,625,158 * | 11/1986 | Taenzer | 318/701 |
| 4,672,521 * | 6/1987 | Riesco | 363/41 |
| 4,739,240 * | 4/1988 | MacMinn et al. | 318/696 |
| 4,763,057 * | 8/1988 | Danz et al. | 318/809 |
| 4,777,419 | 10/1988 | Obradovic | 318/696 |
| 4,896,089 * | 1/1990 | Kliman et al. | 317/701 |
| 4,933,621 * | 6/1990 | MacMinn et al. | 318/696 |
| 4,961,038 * | 10/1990 | MacMinn | 318/696 |
| 5,012,172 * | 4/1991 | Sember | 318/696 |
| 5,166,591 * | 11/1992 | Stephens et al. | 318/701 |
| 5,227,703 | 7/1993 | Boothe et al. | 318/139 |
| 5,313,149 * | 5/1994 | Bahn | 318/727 |
| 5,530,333 | 6/1996 | Turner | 318/701 |
| 5,701,065 * | 12/1997 | Ishizaki | 318/701 |
| 5,736,828 * | 4/1998 | Turner et al. | 318/701 |
| 5,912,542 * | 6/1999 | Zalesski | 318/701 |

* cited by examiner

*Primary Examiner*—Jeffrey Donels
*Assistant Examiner*—Rina Duda
(74) *Attorney, Agent, or Firm*—Dykema Gossett PLLC

(57) ABSTRACT

A circuit and method for controlling a current level in a switched reluctance motor phase coil are provided. The circuit includes a current sensor for generating a current indicative signal indicative of a level of current in the phase coil and first and second comparators for comparing the current indicative signal to upper and lower hysteresis band limit signals. The circuit further includes a drive circuit, such as a flip-flop, for generating a drive signal responsive to the first and second comparators and first and second switches disposed on either side of the phase coil for providing current to the phase coil. The first switch is responsive to the drive signal and a phase control signal to maintain the current in the coil within the hysteresis band defined by the upper and lower hysteresis band limit signals.

18 Claims, 3 Drawing Sheets

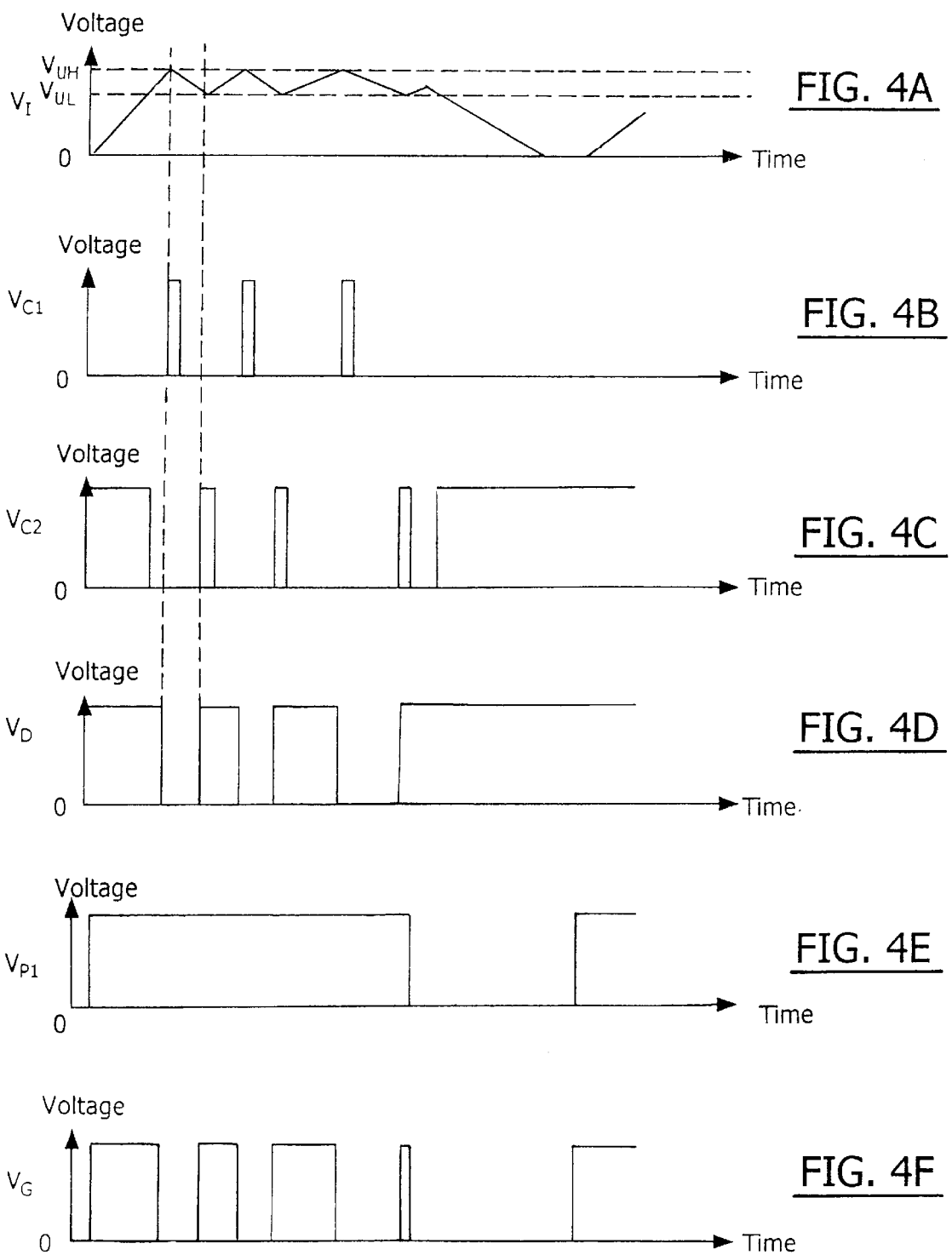

HYSTERESIS CONTROL IN SWITCHED RELUCTANCE MOTORS

BACKGROUND OF THE INVENTION

1. Field of the Invention

This invention relates to switched reluctance motors, and, more particularly, to a method and a circuit for controlling the current in each motor phase of a switched reluctance motor between two predetermined current levels.

2. Disclosure of Related Art

A conventional switched reluctance motor (SRM) includes a stator having a plurality of pairs of diametrically opposed stator poles and a rotor having a plurality of pairs of diametrically opposed rotor poles. Windings or coils are typically disposed about the stator poles and the windings around any two diametrically opposed stator poles may be connected in series or in parallel to define one motor phase of the multiphase SRM. The windings associated with a motor phase may be referred to as a phase coil. By generating current through the phase coil, magnetic fields are established about the stator poles and a torque is produced that attracts a pair of rotor poles into alignment with the stator poles. The current in the phase coils is generated in a predetermined sequence in order to produce a constant torque on the rotor. The period during which current is provided to the phase coil—and the rotor poles are brought into alignment with the stator poles—is known as the "active stage" of the motor phase. At a certain point—either as the rotor poles become aligned with the stator poles or at some point prior thereto—it becomes desirable to commutate the current in the phase coil to prevent a negative or braking torque from acting on the rotor poles. Once this "commutation point" is reached, current is no longer generated in the phase coil and the current is allowed to dissipate from the phase coil. The period during which current is allowed to dissipate from the phase coil is known as the "inactive stage" of the motor phase.

SRMs typically employ pulse width modulation (PWM) or current chopping to control the current level in each phase coil during the active stage of the motor phase. Conventional circuits and methods for performing PWM or current chopping have often incorporated microprocessors. The use of microprocessors is disadvantageous, however, because it increases the cost of the motor and limits the bandwidth of electrical signals within the control system for the motor.

There is thus a need for an apparatus and method for controlling a switched reluctance motor that will minimize or eliminate one or more of the above-mentioned deficiencies.

SUMMARY OF THE INVENTION

The present invention provides a circuit and a method for controlling the level of a current in a phase coil of a switched reluctance motor phase.

An object of the present invention is to provide a circuit and a method for controlling the current in a phase coil that are less expensive than conventional circuits and methods.

Another object of the present invention is to provide a circuit and a method for controlling the current in a phase coil that allow for a greater bandwidth for electrical signals within the control system of the motor.

A circuit for controlling a level of current in a phase coil of a motor phase in accordance with the present invention includes a current sensor, such as a sensing resistor, that generates a current indicative signal indicative of the current level in the phase coil and first and second comparators that compare the current indicative signal to upper and lower hysteresis band limit signals, respectively. The circuit further includes a drive circuit, which may comprise a flip-flop circuit, that outputs a drive signal responsive to the first and second comparators. Finally, the circuit includes means, responsive to the drive signal generated by the drive circuit, for providing the current to the phase coil. In a preferred embodiment of the present invention, the providing means comprises first and second switches that are connected to first and second ends, respectively, of the phase coil. The first switch is responsive to the output of an AND gate that is in turn responsive to the drive signal and a phase control signal. The second switch is responsive to the phase control signal.

A method in accordance with the present invention includes the steps of generating a current indicative signal indicative of the current level in a phase coil, comparing the current indicative signal with an upper hysteresis band limit signal and generating a first comparison signal responsive thereto, and comparing the current indicative signal with a lower hysteresis band limit signal and generating a second comparison signal responsive thereto. The method further includes the steps of generating a drive signal responsive to the first and second comparison signals and providing the current to the phase coil responsive to the drive signal.

A circuit and method in accordance with the present invention represent an analog implementation of a conventional current control strategy for the active stage of an SRM motor phase. Because the circuit and method do not require the use of a microprocessor, the SRM and the control circuitry for the SRM are less expensive than conventional motors and motor controls. Moreover, because the inventive circuit and method do not require the use of a microprocessor, the electrical signals within the control system for the motor can operate within a greater bandwidth than is possible with conventional control circuits.

These and other features and objects of this invention will become apparent to one skilled in the art from the following detailed description and the accompanying drawings illustrating features of this invention by way of example.

BRIEF DESCRIPTION OF THE DRAWINGS

FIGS. 4A–F are timing diagrams illustrating voltage and current levels in the circuit of FIG. 3 over time.

DETAILED DESCRIPTION OF THE PREFERRED EMBODIMENT

Figure 1:
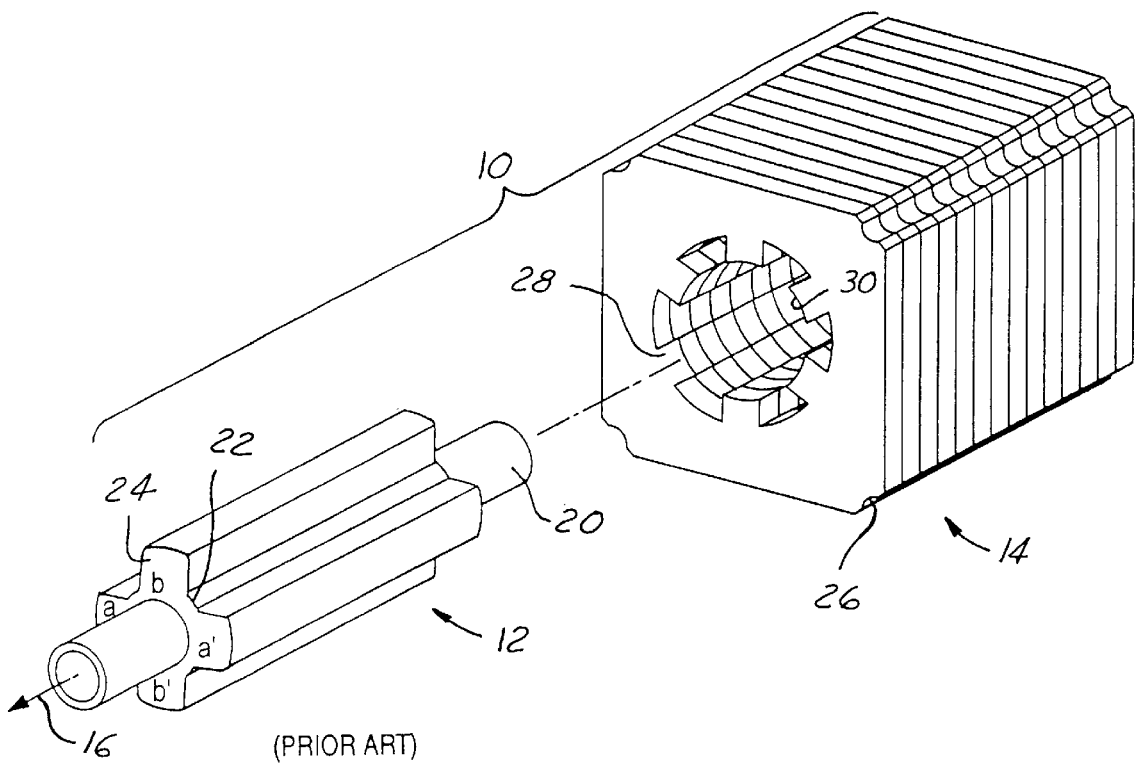
FIG. 1 is an exploded perspective view of a conventional switched reluctance motor.
Figure 2:
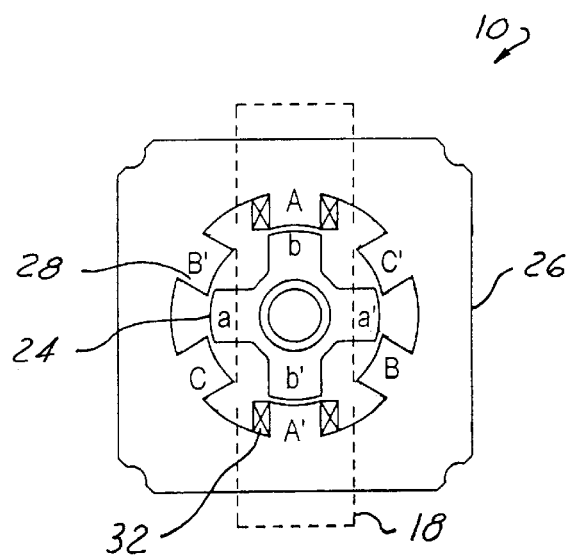
FIG. 2 is a cross-sectional view of a conventional switched reluctance motor.

Referring now to the drawings wherein like reference numerals are used to identify identical components in the various views, FIGS. 1 and 2 illustrate a conventional switched reluctance motor 10. Although the illustrated motor comprises a switched reluctance motor, it should be understood that the invention as disclosed herein could be applied to other motors as is known in the art. Motor 10 includes a rotor assembly 12 and a stator assembly 14, both of which may be centered about an axis 16. A representative motor phase 18 is indicated by a dashed-line box, while the other two motor phases are not shown. Although the illustrated embodiment includes three motor phases 18, it will be understood by those skilled in the art that the number of motor phases 18 may vary.

Rotor assembly 12 is provided to move a load (not shown) connected to rotor assembly 12. Assembly 12 includes a shaft 20 and a rotor 22 disposed about shaft 20. Shaft 20 is provided to engage either the load or another means for engaging the load. Shaft 20 extends longitudinally along axis 16 and may be centered about axis 16. Rotor 22 is provided to impart rotation to shaft 20 and is capable of clockwise or counter-clockwise rotation. Rotor 22 may be made from a material having a relatively low magnetic reluctance, such as iron. Rotor 22 may be centered about axis 16 and may include a spline or key (not shown) configured to be inserted within a keyway (not shown) in shaft 20. Rotor 22 includes a plurality of radially outwardly extending rotor poles 24 configured as diametrically opposed rotor pole pairs a—a', b—b'. Each of poles 24 is generally rectangular in cross-section and may include one or more radially outwardly extending teeth as is known in the art. It will be understood by those skilled in the art that the number of poles 24 of rotor 22 may vary.

Stator assembly 14 is provided produce a torque to cause rotation of rotor assembly 12. Stator assembly 14 may comprise a plurality of laminations 26 that are formed from a material, such as iron, having a relatively low magnetic reluctance. Assembly 14 includes a plurality of radially inwardly extending poles 28 configured as diametrically opposed stator pole pairs A—A', B—B', C—C'. Each pair of stator poles 28 is provided to attract a corresponding pair of rotor poles 24 of rotor assembly 12 and thereby cause rotation of rotor assembly 12. Poles 28 are generally rectangular in cross-section and may include one or more radially inwardly extending teeth (not shown) as is known in the art. Poles 28 may extend along the axial length of stator assembly 14 and define a bore 30 that is adapted to receive rotor assembly 12. It will be understood by those in the art that the number of stator poles 28 may vary.

Rotation of rotor assembly 12 is produced by initiating, and later commutating, in a predetermined sequence, conduction cycles in phase coils 32 surrounding each stator pole pair. Phase coils 32 are formed by connecting, in series or in parallel, windings on diametrically opposed stator poles 28. As one of phase coils 32 begins to conduct current, the nearest rotor pole pair is magnetically attracted towards the stator pole pair around which the energized phase coil is wound. By initiating and commutating conduction cycles in phase coils 32 surrounding consecutive stator pole pairs, a relatively constant torque can be produced.

Figure 3:
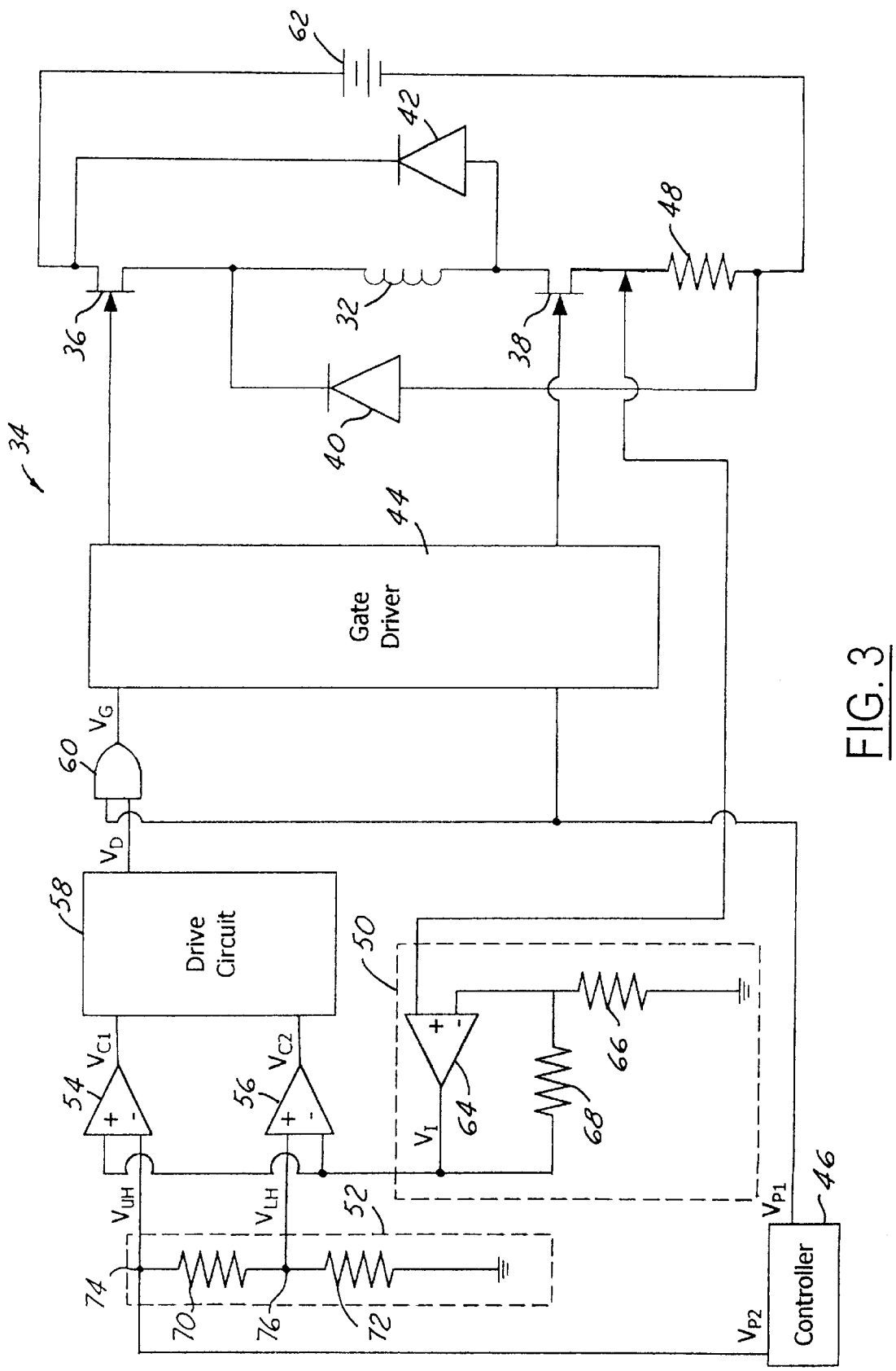
FIG. 3 is a combination schematic and block diagram illustrating a circuit in accordance with the present invention.

Referring now to FIG. 3, a circuit 34 for controlling the current in coil 32 in accordance with the present invention is illustrated. Circuit 34 represents an equivalent circuit for one motor phase 18 of motor 10. It should be understood, however, that portions of circuit 34, such as controller 46, may form part of multiple motor phases 18. Circuit 34 may include means, such as switches 36, 38, for providing current to phase coil 32, diodes 40, 42, a conventional gate driver 44, and a controller 46. In accordance with the present invention, circuit 34 may also include the following elements: means, such as sensing resistor 48 and amplifier circuit 50, for generating a current indicative signal $V_I$ indicative of a level of current in coil 32; means, such as voltage divider circuit 52, for generating upper and lower hysteresis band limit signals $V_{UH}$ and $V_{UL}$; means, such as comparator 54, for comparing current indicative signal $V_I$ to upper hysteresis band limit signal $V_{UH}$ and generating a comparison signal $V_{C1}$ responsive thereto; means, such as comparator 56, for comparing current indicative signal $V_I$ to lower hysteresis band limit signal $V_{UL}$ and generating a comparison signal $V_{C2}$ responsive thereto; means, such as drive circuit 58, for generating a drive signal $V_D$ responsive to comparison signals $V_{C1}$ and $V_{C2}$, and a logic gate 60. Although only one motor phase 18 of motor 10 is illustrated in FIG. 3, it will be appreciated that the other motor phases 18 of motor 10 may have substantially similar constructions.

Switches 36, 38 are provided to selectively couple a power supply 62 to phase coil 32 to energize and deenergize coil 32. Switches 36, 38 are conventional in the art and may take any of a plurality of forms well known in the art. For example, switches 36, 38 may comprise MOSFETs. Switch 36 is connected to a first end of coil 32 in series with coil 32. Switch 38 is connected to a second end of coil 32, also in series with coil 32.

Diodes 40, 42 are provided to control the dissipation of current from coil 32 and, in particular, to return the current in coil 32 to power supply 62. Diodes 40, 42 are conventional in the art. Diode 40 may be connected in parallel with the series combination of switch 36 and coil 32. Diode 42 may be connected in parallel with the series combination of switch 38 and coil 32. When one of switches 36, 38 is open and the other of switches 36, 38 is closed, the current in phase coil 32 circulates within control circuit 34 and dissipates relatively slowly. For example, if switch 36 is opened and switch 38 is closed, the current will circulate along the path comprised of switch 38, diode 40 and coil 32. When both of switches 36, 38 are open, the current in coil 32 rapidly dissipates as it is returned to power supply 62 along the path comprised of power supply 62, diode 42, coil 32, and diode 40.

Controller 46 is provided to initiate and commutate the conduction cycle of each motor phase 18. Controller 46 is conventional in the art and may comprise either discrete circuits or a programmable microcontroller. Controller 46 may generate a phase control signal $V_{P1}$ to control the initiation and commutation of the conduction interval for each motor phase 18. Controller 46 may also generate a phase current signal $V_{P2}$ from which upper and lower hysteresis band limit signals $V_{UH}$ and $V_{UL}$ are obtained.

Sensing resistor 48 is provided to generate a signal indicative of the level of current in coil 32 and is conventional in the art. Resistor 48 may have one terminal connected to switch 38 and a second terminal connected to ground. It will be understood by those in the art that a variety of conventional current sensors could be employed, including, for example, Hall effect current sensors.

Amplifier circuit 50 is provided to convert the signal generated by sensing resistor 48 into current indicative signal $V_I$. Circuit 50 may include operational amplifier 64, and resistors 66, 68, each of which is conventional in the art. Resistor 66 may be connected to the inverting input of amplifier 64 at one end and to ground at another end. Resistor 68 may be connected to the inverting input of amplifier 64 at one end and to the output of amplifier 64 at another end.

Voltage divider circuit 52 is provided to generate upper and lower hysteresis band limit signals $V_{UH}$ and $V_{LH}$. Circuit 52 is conventional in the art and may comprise a pair of resistors 70, 72 connected in series between a terminal of controller 46 and ground.

Comparators 54, 56 are provided to compare current indicative signal $V_I$ to upper and lower hysteresis band limit signals $V_{UH}$ and $V_{LH}$, respectively. Comparators 54, 56 are conventional in the art. The positive input of comparator 54 is connected to the output of amplifier 64 while the negative input of comparator 54 is connected to an upper node 74 of voltage divider circuit 52. Comparator 54 outputs a comparison signal $V_{C1}$ indicative of whether the level of current in coil 32—represented by current indicative signal $V_I$—is less than or greater than a predetermined upper hysteresis band current limit—represented by upper hysteresis band limit signal $V_{UH}$. The positive input of comparator 56 is connected to a lower node 76 of voltage divider circuit 52 while the negative input of comparator 56 is connected to the output of amplifier 64. Comparator 56 outputs a comparison signal $V_{C2}$ indicative of whether the level of current in coil 32—represented by current indicative signal $V_I$—is less than or greater than a predetermined lower hysteresis band current limit—represented by lower hysteresis band limit signal $V_{UL}$. Comparators 54, 56 may compare current indicative signal $V_I$ to limit signals $V_{UH}$ and $V_{UL}$ simultaneously.

Drive circuit 58 is provided to generate a drive signal $V_D$ responsive to comparison signals $V_{C1}$ and $V_{C2}$ output by comparators 54 and 56, respectively. Drive circuit 58 is conventional in the art any may comprise a flip-flop circuit, and, in particular, an SR latch.

Logic gate 60 is provided to ensure that switch 36 is only closed during the conduction interval for the motor phase 18. Gate 60 is conventional in the art and may comprise an AND gate. It should be understood, however, that other gate configurations could be implemented without departing from the spirit of the present invention. Gate 60 is responsive to drive signal $V_D$ and phase control signal $V_{P1}$ such that switch 36 is only closed when drive signal $V_D$ indicates that the current in coil 32 is less than an upper hysteresis band limit during the conduction interval for motor phase 18. Gate 60 generates a gate signal $V_G$ responsive to drive signal $V_D$ and phase control signal $V_{P1}$.

Referring now to FIGS. 3 and 4, a method in accordance with the present invention will be illustrated. A method in accordance with the present invention may include the step of generating a current indicative signal $V_I$ (shown in FIG. 4A) indicative of a level of current in a phase coil 32. As mentioned, hereinabove, current indicative signal $V_I$ may be generated by sensing resistor 48 in connection with amplifier circuit 50. The method may further include the steps of generating upper and lower hysteresis band limit signals $V_{UH}$ and $V_{UL}$, comparing current indicative signal $V_I$ with limit signal $V_{UH}$ and comparing current indicative signal $V_I$ with limit signal $V_{UL}$. As mentioned hereinabove, limit signals $V_{UH}$ and $V_{UL}$ may be generated by voltage divider circuit 52 and be compared to current indicative signal $V_I$ using comparators 54, 56 that generate comparison signals $V_{C1}$ and $V_{C2}$, respectively. Also as mentioned hereinabove, comparators 54, 56 may compare current indicative signal $V_I$ to limit signals $V_{UH}$ and $V_{UL}$ simultaneously. As shown in FIG. 4B, comparison signal $V_{C1}$ assumes a high logic level whenever current indicative signal $V_I$ is greater than upper hysteresis band limit signal $V_{UH}$. As shown in FIG. 4C, comparison signal $V_{C2}$ assumes a high logic level whenever current indicative signal $V_I$ is less than lower hysteresis band limit signal $V_{UL}$.

A method in accordance with the present invention may also include the step of generating a drive signal $V_D$ responsive to comparison signals $V_{C1}$ and $V_{C2}$ generated by comparators 54 and 56, respectively. As mentioned hereinabove, drive signal $V_D$ is generated by a drive circuit 58 which may comprise a flip-flop. As shown in FIG. 4D, drive signal $V_D$ is predisposed to a high logic level at the beginning of the conduction interval for the motor phase 18. When comparison signal $V_{C1}$ transitions to a high logic level, indicating that the current in coil 32 has exceeded an upper hysteresis band limit represented by limit signal $V_{UH}$, drive signal $V_D$ transitions to a low logic level. Drive signal $V_D$ remains at the low logic level until comparison signal $V_{C2}$ transitions to a high logic level, indicating that the current in coil 32 has once again fallen below a lower hysteresis band limit represented by limit signal $V_{UL}$. At that point, drive signal $V_D$ once again transitions to a high logic level.

A method in accordance with the present invention may finally include the step of providing current to phase coil 32 responsive to drive signal $V_D$. The step may include the substeps of controlling switch 36 responsive to drive signal $V_D$ and phase control signal $V_{P1}$ and controlling switch 38 responsive to phase control signal $V_{P1}$. As shown in FIG. 3, switch 36 may be connected, through gate driver 44, to the output of logic gate 60. Switch 38 may be connected directly to a terminal of controller 48. Referring to FIGS. 4A–F, at the beginning of each conduction interval phase control signal $V_{P1}$ transitions to a high logic level, closing switch 38. Because drive signal $V_D$ is already at a high logic level, gate signal $V_G$ transitions to a high logic level and switch 36 is also closed. Because both of switches 36, 38 are closed, current flows into coil 32 and the current, as indicated in FIG. 4A, begins to increase. Once the current in coil 32 exceeds the upper hysteresis band limit represented by limit signal $V_{UH}$, comparison signal $V_{C1}$ causes drive signal $V_D$ to transition to a low logic level, as shown in FIGS. 4B and 4D. This causes gate signal $V_G$ to also transition to a low logic level, as shown in FIG. 4F, and to open switch 36—allowing current to dissipate from coil 32 as shown in FIG. 4A. Once the current in coil 32 falls below the lower hysteresis band limit represented by limit signal $V_{UL}$, comparison signal $V_{C2}$ causes drive signal $V_D$ to transition to a high logic level, as shown in FIGS. 4C and 4D. This causes gate signal $V_G$ to also transition to a high logic level, as shown in FIG. 4F, and to once again close switch 36. This process is repeated until the end of the conduction interval at which point phase control signal $V_{P1}$ transitions to a low logic level causing both of switches 36, 38 to open and allowing the current in coil 32 to be directed back to power supply 62 by diodes 40, 42.

A circuit and a method in accordance with the present invention represent an improvement over conventional means for controlling the current level in a switched reluctance motor phase because the inventive circuit and method do not require the use of a microprocessor to control the current. As a result, a circuit in accordance with the present invention, and any motor that incorporates the circuit or uses a method in accordance with the present invention, will be less expensive as compared to conventional control circuits and motors. Moreover, because the use of microprocessors limits the operating bandwidth for electrical signals within the control circuit, a circuit and method in accordance with the present invention allow for a greater operating bandwidth for electrical signals within the motor's control system.

While the invention has been particularly shown and described with reference to the preferred embodiments thereof, it is well understood by those skilled in the art that various changes and modifications can be made in the invention without departing from the spirit and scope of the invention.

I claim:

1. A circuit for controlling a current in a phase coil of a motor, comprising:
   a current sensor that generates a current indicative signal indicative of a level of said current;
   a first comparator that compares said current indicative signal to an upper hysteresis band limit signal;
   a second comparator that compares said current indicative signal to a lower hysteresis band limit signal;
   a drive circuit responsive to said first and second comparators; and,
   means, responsive to said drive circuit, for providing said current to said phase coil.

2. The circuit of claim 1, further comprising a voltage divider circuit that generates said upper and lower hysteresis band limit signals.

3. The circuit of claim 1, further comprising a logic gate responsive to said drive circuit and a phase control signal wherein said providing means is responsive to an output signal generated by said logic gate.

4. The circuit of claim 1, wherein said current sensor includes a sensing resistor.

5. The circuit of claim 4, wherein said current sensor includes an amplifier circuit.

6. The circuit of claim 1, wherein said drive circuit comprises a flip-flop circuit.

7. The circuit of claim 1 wherein said providing means comprises:
   a first switch connected to a first end of said phase coil and responsive to said drive circuit; and,
   a second switch connected to a second end of said phase coil.

8. The circuit of claim 1 wherein said first and second comparators compare said current indicative signal to said upper and lower hysteresis band limit signals simultaneously.

9. A circuit for controlling a current in a phase coil of a motor, comprising:
   a current sensor that generates a current indicative signal indicative of a level of said current;
   a first comparator that compares said current indicative signal to an upper hysteresis band limit signal;
   a second comparator that compares said current indicative signal to a lower hysteresis band limit signal;
   an SR latch flip-flop that generates a drive signal responsive to said first and second comparators;
   a first switch connected to a first end of said phase coil and responsive to said drive signal and a phase control signal; and,
   a second switch connected to a second end of said phase coil and responsive only to said phase control signal.

10. The circuit of claim 9, further comprising a voltage divider circuit that generates said upper and lower hysteresis band limit signals.

11. The circuit of claim 9, further comprising a logic gate responsive to said drive signal and said phase control signal wherein said first switch is responsive to an output signal generated by said logic gate.

12. The circuit of claim 9 wherein said current sensor includes a sensing resistor.

13. The circuit of claim 9 wherein said first and second comparators compare said current indicative signal to said upper and lower hysteresis band limit signals simultaneously.

14. A method for controlling a current in a phase coil of a motor, comprising the steps of:
   generating a current indicative signal indicative of a level of said current in said phase coil;
   comparing said current indicative signal with an upper hysteresis band limit signal and generating a first comparison signal responsive thereto;
   comparing said current indicative signal with a lower hysteresis band limit signal and generating a second comparison signal responsive thereto;
   generating a drive signal responsive to said first and second comparison signals; and,
   providing said current to said phase coil responsive to said drive signal.

15. The method of claim 14, further comprising the step of generating said upper and lower hysteresis band limit signals.

16. The method of claim 14, wherein said providing step includes the substep of controlling a first switch connected to a first end of said phase coil responsive to said drive signal and a phase control signal.

17. The method of claim 16, wherein said providing step includes the substep of controlling a second switch connected to a second end of said phase coil responsive to said phase control signal.

18. The method of claim 14 wherein said step of comparing said current indicative signal to said upper hysteresis band limit signal and said step of comparing said current indicative signal to said lower hysteresis band limit signal occur simultaneously.

* * * * *